United States Patent [19]

Hazelton et al.

[11] Patent Number: 4,857,409
[45] Date of Patent: Aug. 15, 1989

[54] CLEAR BARRIER COMPOSITES CONTAINING POLYISOBUTYLENE/POLYOLEFIN ALLOY COMPONENTS

[75] Inventors: Donald R. Hazelton, Chatham; Cindy B. Shulman, Cliffside Park, both of N.J.

[73] Assignee: Exxon Chemical Patents Inc., Linden, N.J.

[21] Appl. No.: 74,981

[22] Filed: Jul. 17, 1987

Related U.S. Application Data

[63] Continuation of Ser. No. 699,832, Feb. 8, 1985, abandoned.

[51] Int. Cl.⁴ .............................................. B32B 25/08
[52] U.S. Cl. ................................... 428/494; 428/35.2; 428/517
[58] Field of Search ........................ 428/494, 517, 35

[56] References Cited

U.S. PATENT DOCUMENTS

| | | | |
|---|---|---|---|
| 4,140,162 | 2/1979 | Gajewski et al. | 150/1 |
| 4,203,876 | 5/1980 | Dereppe et al. | 260/17.4 |
| 4,399,181 | 8/1983 | Yoshimura et al. | 428/213 |

*Primary Examiner*—Edith Buffalow

[57] ABSTRACT

A composite film composition comprising a rubber containing core layer wherein the layer comprises about 50 to 85 wt % rubber and 15 to 40 wt % of a polyolefin and at least one polyolefin skin layer co-extruded onto said core layer. In a preferred embodiment, the core layer comprises about 55 to about 70 wt % PIB and about 30 to about 45 wt % of PP or RCPP having been co-extruded to be sandwiched between two polyolefin layers comprisng PP or RCPP.

32 Claims, 2 Drawing Sheets

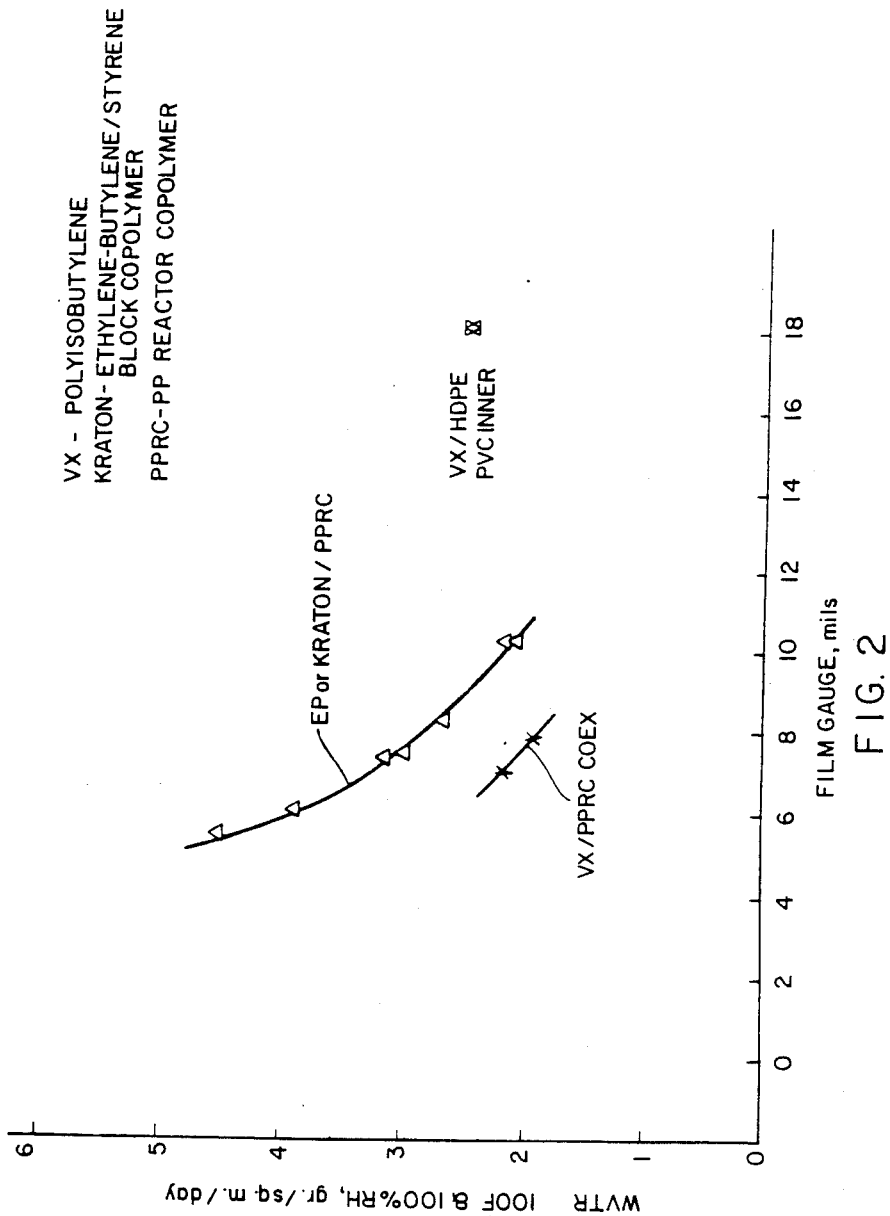

CLEAR BARRIER COMPOSITES CONTAINING POLYISOBUTYLENE/POLYOLEFIN ALLOY COMPONENTS

This is a continuation of application Serial No. 699,832, filed 2/8/85, now abandoned.

Parenteral drugs are commonly stored in plasticized polyvinyl chloride pouches and transferred directly from the pouch to the patient-user. The advantage of plasticized PVC for such applications is that it is clear and can be autoclaved for sterilization without damage to the pouch. Additionally, the plasticized PVC pouch has a sufficiently high burst strength so as to withstand dropping or other rough handling. However, plasticized PVC has a high water vapor transmission rate (WVTR) at the thickness of film used for the pouches, e.g., 15 g/m²/day for a 14 mil film. The pouch must therefore be overwrapped to reduce water loss to minimize the drug concentration variation which would otherwise occur. The overwrap is generally a blend of polyisobutylene (PIB) and high density polyethylene (HDPE) comprising about 30 wt % PIB and 70 wt % HDPE. A further disadvantage of PVC is that it requires liquid plasticizers such as phthalates which can be leached from the bag and are suspected carcinogens.

U.S. Pat. No. 4,140,162 discloses an autoclavable composition which is a polymer blend comprising (a) about 10 to 40 wt % polypropylene, (b) 40 to 85 wt % of a block copolymer comprising (1) a central block comprising 50-85 wt % of the polymer of an ethylene-butylene copolymer and (2) terminal blocks of polystyrene, and (3) 0 to 40 wt % of polyethylene, poly (ethylene vinyl acetate), or poly (ethylene-propylene). The composition is suggested for use in blood containing bags, tubing and medical solution containers. It is deficient from the standpoint of water vapor transmission rate to be made economically into an overwrap-free container and does not heat seal readily.

Enteral feeding bags used to administer liquid diets are prepared from a sandwich laminate comprising an inner heat seal layer of about 40 wt % polyisobutylene and about 60 wt % polypropylene. The first outer layer of the laminate comprises about 0.5 mils of polyester and the second layer about 0.5 mils of polyvinylidene chloride. A tie layer of adhesive is required. The laminate has a thickness of about 5 mils. It lacks the flexibility, softness and "feel" of the plasticized PVC bags and does not have sufficient burst strength or drop impact strength for use as blood or parenteral drug bags.

U.S. Pat. No. 4,399,181 discloses laminates of two or more polymer compositions which have utility as shrink films. One of the blends disclosed includes inter alia butyl rubber with polypropylene. The butyl rubber is equated to ethylene-alpha olefin copolymers and block copolymerized thermoplastic elastomers of styrene-conjugated diene, the preferred polymer being ethylene-alpha-olefin copolymer. In general, the laminates have one layer which comprises 50-100% crystalline polybutene or a sandwich constitution wherein the crystalline polybutene comprises 50% to 100% of the core. The outer layer of the "sandwich" comprises a blend of at least two polymers, one of which is a soft polymer, e.g., butyl rubber.

Japanese patent application No. 022447 filed Feb. 25, 1975, discloses blends of ethylene-alpha-olefin copolymers with polypropylene for use as a substitute for plasticized PVC.

French patent application No. 006029 discloses blends of a thermoplastic polymer, vegetable fibrous material and a synthetic elastomer. The blend can comprise polypropylene with ethylene/alpha olefin copolymer and wood fibers.

Copending patent application No. 453,727 filed Dec. 27, 1982, now U.S. Pat. No. 4,500,681, granted Feb. 19, 1985, discloses a monolayer packaging film comprising polypropylene, polyisobutylene and ethylene/vinyl acetate copolymer. The film lacks clarity and has a high internal haze. The composition comprises about 20-60 wt % PIB, 20-65 wt % of polypropylene or RCPP and 7 to about 40 wt % of EVA.

What is required for use in parenteral drug or blood bags is a polymer composition having a low water vapor transmission rate, good clarity and a high burst strength when formed into bags. Additionally, the composition should be free of leachable components such as liquid plasticizers, e.g., dioctylphthalate, and have high tear resistance, high flexibility and be autoclavable at steam temperatures of 121° C.

BRIEF DESCRIPTION OF DRAWINGS

FIG. I - Schematic of Extrusion Process

FIG. II - Effect of Film Gauge and Composition on WVTR Properties

SUMMARY OF THE INVENTION

Figure 1:
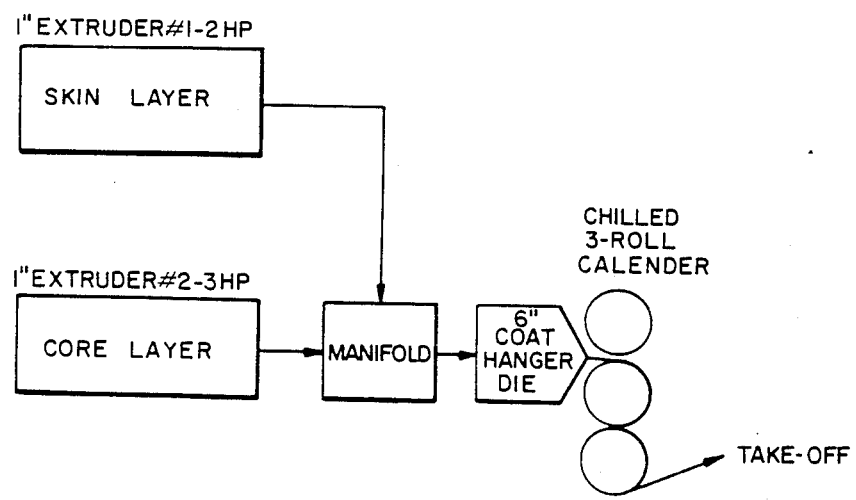
Figure 1:
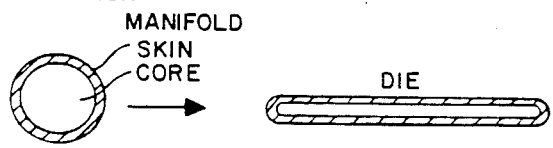

It has surprisingly been found that flexible polymer compositions of high clarity with acceptable burst strength which are steam autoclavable can be prepared by forming a multi-layered structure of a polyolefin and an elastomeric composition wherein the elastomeric composition has a low water vapor transmission rate.

The preferred elastomeric composition contains an isobutylene elastomer which has a low water vapor transmission rate, for example, polyisobutylene, butyl rubber or halogenated butyl rubber. The polyolefin can be semi crystalline or crystalline resins which have melting points in excess of 110° C. to permit steam autoclaving, e.g., polypropylene, reactor polypropylene, linear low density polyethylene and polybutene-1.

DETAILED DESCRIPTION

This invention relates to a composite film suitable for use in parenteral drug or blood container applications. In particular, it relates to a clear, flexible, autoclavable film which when formed into a parenteral drug or blood bag has a high burst strength. In a preferred embodiment, a 7 mil film has a water vapor transmission rate of less than 2.5 g/m²/day.

The composite film of this invention comprises at least one layer of polyolefin and at least one layer of an elastomeric composition. Preferably, the elastomeric composition is sandwiched between two layers of polyolefin composition. Since the film must withstand autoclaving at about 121° C. it is preferred that it not shrink when heated in an autoclave. Shrinkage can result in rupture of the bag formed from the film. In order to impart thermal stability and eliminate shrinkage, the elastomeric composition is blended with a minor amount of polyolefin, e.g., at least 15 wt %.

The polyolefin resins which are suitable for use in the practice of this invention for blending with the elastomer are those which have a semi-crystalline or crystalline melting point of at least 110° C. Illustrative, non-limiting examples of the polyolefins suitable for use in the practice of this invention are polypropylene (PP), linear low density polyethylene (LLDPE) and polybutylene (PB). As used in the specification and claims, the term "polypropylene" includes homopolymers of propylene as well as reactor copolymers of polypropylene (RCPP) which can contain about 1 to about 20 wt % ethylene or an alpha olefin comonomer of 4 to 16 carbon atoms. The polypropylene can be highly crystalline isotactic or syndiotactic polypropylene. The RCPP can be either a random or block copolymer. The density of the PP or RCPP can be about 0.89 to about 0.91 g/cc.

High density polyethylene (HDPE), useful as the polyolefin resin layer of the multi-layer film of this invention, has a density of about 0.941 to about 0.965 g/cc. High density polyethylene is an established product of commerce and its manufacture and general properties are well known to the art. Typically, HDPE has a relatively broad molecular weight distribution, characterized by the ratio of weight average molecular weight to number average molecular weight of from about 20 to about 40.

The term "polybutylene" generally refers to thermoplastic resins of both poly (1-butene) homopolymer and the copolymer with, for example, ethylene, propylene, pentene-1, etc. Polybutylene is manufactured via a stereospecific Ziegler-Natta polymerization of monomer(s). Commerically useful products are of high molecular weight and isotacticity. A variety of commercial grades of both homopolymer and ethylene copolymer are available with melt indices that range from about 0.3 to about 20 g/10 min.

The term "low density polyethylene" or "LDPE" as used in the specification and claims means both low and medium density polyethylene having densities of about 0.910 to about 0.940 g/cc. The terms include linear polyethylene as well as copolymers of ethylene which are thermoplastic resins.

Linear low density polyethylene (LLDPE) is a relatively new class of low density polyethylene characterized by little, if any, long chain branching, in contrast to conventional LDPE. The processes for producing LLDPE are well known in the art and commercial grades of this polyolefin resin are available. Generally, it is produced in gas-phase fluidized bed reactors or liquidphase solution process reactors; the former process can be carried out at pressures of about 100 to 300 psi and temperatures as low as 100° C.

Polyethylene copolymers suitable as the polyolefin resins of this invention include copolymers of ethylene with unsaturated esters of lower carboxylic acids as well as the carboxylic acids per se. In particular, copolymers of ethylene with vinylacetate or alkyl acrylates, for example, methyl acrylate and ethyl acrylate, can be employed. These ethylene copolymers typically comprise about 60 to about 97 wt % ethylene, preferably about 70 to 95 wt % ethylene, more preferably about 75 to about 90 wt % ethylene. The expression "ethylene copolymer resin" as used in the specification and claims means, generally, copolymers of ethylene with unsaturated esters of lower ($C_1$-$C_4$) monocarboxylic acids and the acids themselves; e.g., acrylic acid, vinyl esters or alkyl acrylates, while the expression "EVA" means, specifically, ethylene-vinylacetate copolymers. Illustrative of the acrylates which can be utilized are methyl acrylate and ethyl acrylate.

For the purpose of this disclosure, as used in the specification and claims the term polyolefin includes PVDC. The rubbers which can be used in the practice of this invention include both synthetic and natural rubbers; preferably the rubbers have a glass transition temperature (Tg) of less than 0° C. Illustrative, non-limiting examples of rubbers suitable for use in the practice of this invention include polyisobutylene (PIB), butyl rubber, halogenated butyl rubber, ethylene propylene rubber (EPM), ethylene-propylenediene rubber (EPDM), polyisoprene, polychloroprene, styrene-butadiene rubber, polybutene copolymers, nitrile rubbers, chlorosulfonated polyethylene, etc. While polyisobutylene (PIB) is not a true rubber because it cannot be vulcanized, it can be utilized in the practice of this invention provided that the PIB has a viscosity average molecular weight (Flory) of about 900,000 to about 1.6 million.

The term "rubber" as used in the specification and claims means any natural or synthetic polymer which can be vulcanized or cured so as to exhibit elastomeric properties. For the purpose of this invention, PIB is considered a rubber although it cannot be vulcanized.

The terms EPM and EPDM are used in the sense of their ASTM designations (ASTMD-1418-72a). EPM is an ethylene-propylene copolymer which can be cross-linked by radiation curing or peroxide curing.

As used in the specification and claims the term "EPDM" means terpolymers of ethylene and alphaolefin and a non-conjugated diene. The non-conjugated diolefin can be straight chain, branched chain or cyclic hydrocarbon di-olefins having about 6 to about 15 carbon atoms such as:

A. straight chain acyclic dienes such as 1,4-hexadiene and 1,6-octadiene;
B. branched chain acyclic dienes such as 5-methyl-1, 4-hexadiene; 3,7-dimethyl-1,6-octadiene; 3,7-dimethyl-1, 7-octadiene and the mixed isomers of dihydro-myricene and dihydro-ocinene;
C. single ring alicyclic dienes such as 1,3-cyclopentadiene; 1,4-cyclohexadiene; 1,5-cyclo-octadiene and 1,5-cyclododecadiene;
D. multi-ring alicyclic fused and bridged ring dienes such as tetrahydroindene, methyl, tetrahydroindene, dicyclopentadiene; bicyclo-(2,2,1)-hepta-2, 5-diene; alkenyl, alkylidene, cycloalkenyl and cycloalkylidene norbornenes such as 5-methylene-2-norbornene (MNB), 5-propenyl-2-norbornene, 5-isopropylidene-2-norbornene, 5-(4-cyclopentenyl)-2-norbornene, 5-cyclohexylidene-2-norbornene, 5-vinyl-norbornene and norbornadiene.

Of the non-conjugated dienes typically used to prepare EPDM terpolymers the preferred dienes are dicyclopentadiene, 1-,4-hexadiene, 5-methyl-2-norbornene and 5-ethylidene-2-norbornene. Particularly preferred diolefins are 5-ethylidene-2-norbornene (ENB) and 1,4-hexadiene.

EPDM elastomers and their general method of manufacture are well known in the art. The preferred EPDM elastomers contain about 20 to about 90 wt % ethylene, more preferably about 30 to 80 wt % ethylene, most preferably about 35 to about 75 wt % ethylene.

The alpha-olefins suitable for use in the preparation of EPDM are preferably $C_3$-$C_{16}$ alpha olefins. Illustrative non-limiting examples of such alpha olefins are propylene, 1-butene, 1-pentene, 1-hexane, 1-octene and 1-dodecene. The alpha olefin is generally incorporated into the EPDM polymer at about 10 to about 80 wt %, more preferably at about 20 to about 70 wt %. The non-conjugated diene is incorporated into the EPDM at about 0.5 to about 15 wt %; more preferably about 1 to about 5 wt %, e.g., 3 wt %.

The term "nitrile rubber" means an acrylonitrile copolymer rubber. Suitable nitrile rubbers comprise rubbery polymers of 1,3-butadiene or isoprene and acrylonitrile. Preferred nitrile rubbers comprise polymers of 1,3-butadiene and about 20–50 wt % acrylonitrile. Any nitrile rubber which is a "solid" rubber having an average molecular weight of at least 50,000, and preferably between about 100,000–1,000,000 can be used. Commercially available nitrile rubbers suitable for the practice of the invention are described in *Rubber World Blue Book*, 1980 Edition, "Materials and Compounding Ingredients for Rubber," pages 386–406.

Butyl rubber is a copolymer of an isoolefin and a conjugated multiolefin. The useful copolymers comprise a major portion of isoolefin and a minor amount, preferably not more than 30 wt %, of a conjugated multiolefin. The preferred copolymers comprise about 85–99.5 wt % (preferably 95–99.5 wt %) of a $C_4$–$C_7$ isoolefin, such as isobutylene, and about 15–0.5 wt % (preferably about 5–0.5 wt %) of a multiolefin of about 4–14 carbon atoms. These copolymers are referred to in the patents and literature as "butyl rubber"; see, for example, the textbook *Synthetic Rubber* by G. S. Whitby (1954 edition by John Wiley and Sons, Inc.), pages 608–609, etc. The term "butyl rubber" as used in the specification and claims includes the aforementioned copolymers of an isoolefin having 4–7 carbon atoms and about 0.5 to 20 wt % of a conjugated multiolefin of about 4–10 carbon atoms. Preferably these copolymers contain about 0.5 to about 5% conjugated multiolefin. The preferred isoolefin is isobutylene. Suitable conjugated multiolefins include isoprene, butadiene, dimethyl butadiene, piperylene, etc.

Commercial butyl rubber is a copolymer of isobutylene and minor amounts of isoprene. It is generally prepared in a slurry process using methyl chloride as a vehicle and a Friedel-Crafts catalyst as the polymerization initiator. The methyl chloride offers the advantage that $AlCl_3$, a relatively inexpensive Friedel-Crafts catalyst is soluble in it, as are the isobutylene and isoprene comonomers. Additionally, the butyl rubber polymer is insoluble in the methyl chloride and percipitates out of solution as fine particles. The polymerization is generally carried out at temperatures of about $-90°$ C. to $-100°$ C. See U.S. Pat. Nos. 2,356,128 and 2,356,129 incorporated herein by reference.

In the halogenation process, butyl rubber in solution is contacted with chlorine or bromine in a series of high-intensity mixing stages. Hydrochloric or hydrobromic acid is generated during the halogenation step and must be neutralized. For a detailed description of the halogenation process see U.S. Pat. Nos. 3,029,191 and 2,940,960, as well as U.S. Pat. No. 3,099,644 which describes a continuous chlorination process, all of which patents are incorporated herein by reference.

The rubbers used in the practice of this invention are preferably utilized in their unvulcanized state. The preferred rubber is PIB. In a preferred embodiment, the rubber is blended with about 15 to 40 wt % of a polyolefin, preferably about 15 to 35 wt % of polyolefin. In another embodiment of the invention, about 55 to about 70 wt % rubber is blended with about 30 to about 45 wt % polyolefin. The preferred polyolefins suitable for blending with the rubbers are polypropylene (PP), and reactor copolymers of polypropylene (RCPP); more preferably RCPP are blended with the rubber. Blending of the rubber with a polyolefin eliminates or substantially reduces shrinkage of the composite film of this invention upon heating. For example, a laminate of sandwich construction prepared having outer surfaces of PP and a core of 100% PIB, will shrink when formed into a bag, filled with a liquid and autoclaved. The shrinkage is sufficient to occasionally cause the bag to rupture. Blending the PIB with a polyolefin eliminates this problem. The rubber component of the rubber composition comprises about 50 to about 85 wt % of the composition, preferably about 60 to about 85 wt %, more preferably about 65 to about 85 wt %, the balance being polyolefin.

The compositions of this invention can include rubber extender oils whose refractive index is about the same as that of the elastomeric compounds as well as processing aids and stabilizers. Parenteral drugs are generally steam autoclaved at about 121° C. in order to sterilize the drug. The bag prepared from the composite film of this invention must not only withstand the autoclave conditions, it must also exhibit a low water loss both during autoclaving and in storage. Rubbers based on isobutylene, e.g., PIB and butyl rubber, have the lowest water vapor transmission rate among polymers. Hence, they are the preferred rubbers of this invention. The PIB, butyl rubbers and halogenated butyl rubbers are most advantageously used in composite films of the sandwich type wherein the rubber core is encased in outer faces of polyolefin resin since these isobutylene containing polymers are amorphous in character and have a surface tack which results in blocking of the film when wrapped on a mandrel or core. Where a two layer laminate is to be used, the preferred rubbers are EPM or EPDM. The rubbers of this invention are generally used in the unvulcanized or "gum" state.

The thickness of the composite film is not critical, however, it must be sufficient to provide adequate vapor barrier properties and bursting strength.

The water vapor transmission rate (WVTR) is preferably less than 2.5 g/m$^2$/day. This WVTR can be achieved using composite films of less than 11 mils, preferably less than 7 mils. While the thickness of the film can vary over a wide range, its thickness will depend in part on the size of the container to be fabricated from it. Film thickness of 1 to 12 mils can advantageously be used in the practice of this invention, preferably the composite films of this invention are about 4 to about 12 mils, more preferably about 6 to 12 mils. Thicker films can be used but they offer no technical advantage and are uneconomical.

The advantageous water vapor barrier properties of the compositions of this invention may be appreciated by reference to FIG. II. Plasticized PVC has a WVTR of about 15 g/m$^2$/day for a 14 mil film. When a liquid-containing plasticized PVC bag is overwrapped with a PIB/HDPE overwrap, the WVTR is reduced to 2.5 for an equivalent of 18 mils of barrier material. The Kraton/RCPP curve is indicative of the WVTR for the product of U.S. Pat. No. 4,140,162 while the VX/RCPP curve is indicative of the WVTR of the film of this invention. It is noted that at 7 mils the films of this invention are more effective vapor barriers than the best prior art compositions at about 10 mils.

The polyolefin layer component of the composite film represents about 2 to about 40% of the film thickness, preferably about 5 to 30%, more preferably about 8 to 20%. Generally the polyolefin component will be about 0.2 to 2 mils in thickness, preferably about 0.4 to about 1.5 mils.

While haze will be in part a result of the film composite composition, substantially clear films can be prepared by using processing techniques which result in smooth surfaced film.

It had previously been believed that the clarity problem with these blends was due to the extent or degree of dispersion of rubber particles in the blend. However, it has been surprisingly discovered that haze in elastomer/polyolefin blends is a surface phenomenon. The following experiments demonstrated that the problem is due primarily to the surface condition of the film.

Haze measurements were taken in air on films that were sandwiched between microscope-quality glass plates. The same films were then coated on both sides with droplets of oil having a refractive index of 1.492. Assuming surface scattering effects have been minimized, i.e., the R.I. (refractive index) of the oil closely matches that of the film and the glass surfaces are perfectly flat, any residual haze after the oil is applied is predominantly internal to the film.

The following resin blends were prepared by mixing the components in the proportion indicated and were extruded to form monolayer films:

TABLE I

| Film Blend | Elastomer (Wt %) | Polyolefin (wt %) | | |
|---|---|---|---|---|
| | | LLDPE | PP | HDPE |
| A | 40[1] | | 60[3] | |
| B | 40[5] | | 60[3] | |
| C | 25[6] | 14[7] | 61[3] | |
| D | 30[9] | | 70[8] | |
| E | 30[2] | | | 70[4] |
| F | 30[5] | | | 70[4] |

[1] PIB, Flory $M_v$ = 1,200,000
[2] PIB, Flory $M_v$ = 1,600,000
[3] PP 4MFR
[4] HDPE 0.3 MI
[5] Butyl 065, Mooney of 41–49 (ML1 + 8) @ 100° C.; 0.8% unsaturation
[6] EPM rubber comprising 74–78 wt % ethylene: Mooney (1 + 8) 127° C. = 50
[7] LLDPE (1 MI)
[8] PP (PPRC 4MFR)
[9] EPDM, ethylene content - 80 wt %, Mooney (1 + 8) 127° C. = 15

Test Procedures

Properties of various film samples were measured using the following test procedures:
Tensile, ASTM D 882
% Elongation, ASTM D 882
Tear, ASTM D 1922
Dart impact, ASTM D 1709
Stiffness, ASTM D 882
% Haze, ASTM D 1003
Gloss, ASTM D 2457

The relative haze of the samples was determined in the aforedescribed manner. The results are shown in Table II.

TABLE II

| Film Blend | A | B | C | D | E | F |
|---|---|---|---|---|---|---|
| Thickness (mils) | 4 | 2 | 6 | 6 | 2 | 4 |
| Relative Haze | | | | | | |
| External | 82 | 90 | 93 | 95 | 9 | 55 |
| Internal | 18 | 10 | 7 | 5 | 91 | 45 |

The data in Table II reveals that for elastomer/HDPE (fractional melt index) blends (those used commercially in medical overwrap applications) the haze is predominantly internal and is crystallization related (Examples E & F). However, in the elastomer bi-blends and tri-blends of Films A, B, C and D, the haze is primarily a function of film surface roughness.

The discovery that haze is a surface phenomenon makes possible the use of rubber-rich polyolefin blends in this invention, while still achieving good clarity in a nonoriented film.

The process of the present invention may be carried out by utilizing conventional extruders and slotted dies used in the manufacture of films. The counterrotating rollers through which the web is passed may consist of a chrome plated chill roll for quenching the film and a resilient roller preferably having a glossy rubber surface.

The resilient roller may be of the type described in U.S. Pat. No. 4,368,240, the disclosure of which is incorporated herein by reference. The roller may include a metal core provided with an intermediate layer of resilient material such as 60–80 Shore A durometer rubber and finally by a skin layer of glossy rubber such as silicone rubber. The skin layer and intermediate layer in combination impart a Shore A hardness value in the range of 65 to 95. The skin thickness of the inner layer and skin layer will be dictated by practical considerations for manufacturing the film and economics. Thicknesses that have worked particularly well in processing elastomeric blends of the present invention are a skin layer thickness of 10 mil and an inner layer thickness of 250 mil.

Suitable silicones for coating the roller include silicone resins sold by General Electric under the trade designation RTU 670 and sold by Dow Corning Corporation under the trade designation Sylastic and Sylgard. These resins can be used in the manufacture of a rubber roll having a high gloss and durable surface as described in U.S. Pat. No. 4,368,240. Moreover, silicone rubber rolls of this type may be purchased from Nauta Roll Corporation of Kensington, Conn.

An air knife may be used to assist in cooling the web between the die and the nip of the counterrotating rollers. The cooling effects aid in eliminating draw resonance and also in preventing the web from sticking to the rubber roll.

Preparation of compositions usable in this invention can be achieved in several different ways. The various components may be brought into intimate contact by, for example, dry blending these materials and then passing the overall composition through a compounding extruder. Alternatively, the components may be fed directly to a mixing device such as a compounding extruder, high shear continuous mixer, two roll mill or an internal mixer such as a Banbury mixer. The optional ingredients previously described can be added to the composition during this mixing operation. Overall, the objective is to obtain a uniform dispersion of all ingredients and this is readily achieved by inducing sufficient shear and heat to cause the melting of the plastics component(s) controlled as is normally done by one skilled in the art so as to avoid molecular weight degradation.

In operation, the elastomer/polyolefin blend is extruded from a slotted die to form a molten web which is passed through the nip of the counterrotating chill roll and resilient roll. An air knife may be used on either or both sides of the web to assist in the cooling action if the drawdown is sufficient to cause draw resonance. The web enters the nip at a temperature above the melting point of the blend. The resilient roller presses the web into intimate contact with the chill roll causing the web to cool and solidify. The web is carried around a circumferential portion of the chill roll and withdrawn and formed into a roll in the conventional manner.

The rubber composition of the composite film generally represents about 60 to about 98% of the film thickness. While the rubber compositions of this invention cast using prior art techniques are not clear, when they are used in conjunction with the polyolefin component, relatively haze free composites are formed. The term "clear" as used in the specification and claims with respect to the composite films of this invention mean films having a haze of less than 30% as measured on a Gardner Instrument XL-211 hazemeter (ASTM D1003). Preferably, the film has a haze of less than 20%, more preferably less than 10%.

Effects of Polishing With Silicone Rubber Roll Surface

In order to demonstrate the effects of polishing with a high gloss rubber roll/chrome chill roll vs. a 3 roll stack of rolls, the following experiments were conducted.

The resin of Film Blend C was extruded from a conventional slotted die using a conventional extruder and cast, or processed through the nip of the rubber roll arrangement.

Rubber Roll Arrangement

Chromed chill roll maintained at 70°–100° F.
Rubber roll - silicone coated (purchased from Nauta Roll Corporation, Inc.)
The physical properties shown in Table III of the film samples were determined.

TABLE III

| Film Thickness (mils) | | Cast | | | Polished | | |
|---|---|---|---|---|---|---|---|
| | | 4 | 8 | 12 | 4 | 8 | 12 |
| Tensile, psi | MD | 6,800 | 4,900 | 4,300 | 7,200 | 6,200 | 4,500 |
| | TD | 5,300 | 3,800 | 3,400 | 6,100 | 4,100 | 2,800 |
| % Elongation | MD | 650 | 700 | 700 | 750 | 800 | 700 |
| | TD | 800 | 650 | 650 | 900 | 700 | 650 |
| Tear, g/mil | MD | 75 | 100 | 110 | 220 | 100 | 115 |
| | TD | 300 | 110 | 100 | 440 | 115 | 120 |
| Dart Impact, in lbs/mil | | 15 | 18 | 19 | 20 | 18 | 18 |
| Stiffness, psi | MD | 89,000 | 100,000 | 94,000 | 69,000 | 93,000 | 94,000 |
| | TD | 79,000 | 81,000 | 85,000 | 50,000 | 79,000 | 86,000 |

The data in Table III reveals that processing by the present invention improves the physical properties of the film for film thicknesses 4 and 8 mils. Heat transfer limitations encountered in the thicker films somewhat limited the effects of the present invention on the properties of those films.

Additional tests have been conducted to compare the effects of processing on film clarity. The resin samples below were processed by the present invention or by a conventional 3 roll stack of metal (chrome) rolls such as that used in metal calendering. Table IV presents the comparisons:

TABLE IV

| Film | Film Thickness (mils) | % Haze | | Gloss (60°) |
|---|---|---|---|---|
| | | 3 Roll Stack | Glossy Silicone/ Metal | |
| C | 4 | Not Possible | 7 | 96/97* |
| | 8 | 15 | 10 | 66/82 |
| | 12 | 20 | 14 | 60/62 |
| D | 4 | Not Possible | 4 | |
| | 8 | 8 | 4 | |
| | 12 | 10 | 6 | |

*Si rubber side/chromed chill roll side

Thin gauge film of uniform clarity could not be produced on the 3-roll stack. The above gloss data was based on samples produced using a mirror finish silicone rubber coated roller having a Shore A hardness of 78. Additional tests using a dull silicone rubber coating (Shore A hardness 64) resulted in Gloss (60°) ranging from 7/57 to 18/80 for the 3 C films.

The glossy silicone rubber coated rolls improved the film clarity for each thickness. It is significant to note that these improved results were obtained at line speeds of 34–40 fpm as compared to 10–15 fpm for the 3 roll stack arrangement.

While it is of course preferred that the composite films of this invention be prepared using the aforedescribed polished silicone rolls, it is not essential to do so where the film is used to package liquids. So long as a polished metal chill roll is used as one of the rolls, the rubber roll can be a conventional uncoated or matte finish rubber roll. In that event, however, the composite film must be utilized in making the medical container bags of this invention so that the surface which was in contact with the rubber roll is the internal surface of the bag. When filled with liquid, haze due to the rough (rubber roll contacted) surface is eliminated as a result of fluid filling the textured surface and eliminating the light scatter which causes haze.

In one embodiment of the invention, the composite film of this invention is produced by extruding a "rod" of core material comprising the rubber composition, passing it through a manifold and extruding a skin layer of polyolefin over the core and subsequently flattening the coated "rod" into a sheet using a coat hanger die. This flattened sheet is then passed through the nip formed between a rubber roll and a polished metal chill roll. The resulting product is a "sandwich" of rubber core encased in a polyolefin "skin." A schematic of this extrusion process is shown in FIG. I.

The advantage of the instant invention may be more readily appreciated by reference to the following examples.

EXAMPLES 1-8

Film composites were prepared using the formulations shown in Table V. Their physical properties are shown in Table VI. In general, the clarity of each sheet was very good. The haze was particularly low (5.3%), as in Example 3, where the elastomer component of the core was Vistalon 1721, an EPDM having a 15 Mooney (1+8 @127° C.) and 80 wt % ethylene content. While the PIB composition (Example 7) showed a relatively high haze, when a bag was prepared from this composition with the rubber roll contacted surface facing inward and the bag filled with water, the bag exhibited outstanding contact clarity and very high gloss. Hence, when care is taken to use the film composite as described above, where only one surface of the composite contributes to the high haze, even haze levels in excess of 25% can be tolerated. Such is not the case where both surfaces of the composite are par in smoothness.

The film compositions wherein the core was comprised of rubber alone, Examples 3, 4 and 5 had the greatest flexibility. Nonetheless, the composite films of Examples 6 and 7 (cores containing butyl rubber and PIB respectively), were significantly less stiff than the other films, even in the case of Example 8 where no skin was used. The composite of Example 7 (PIB) had superior water vapor barrier properties as compared to the other films. The cores containing butyl and PIB had exceptional tear resistance. This is surprising since these uncured rubbers exhibit cold flow in the gum state and have poor physical properties when used as such.

In order to determine the autoclavability of the films, bags were prepared of each of the films, filled with water, heat sealed and autoclaved at 117° C. for 60 minutes. The containers were cooled overnight at 40 psig air overpressure. The results are shown in Table VII. The bags made from film wherein the core material was rubber alone (Examples 3-5) exhibited excessive shrinkage and ruptured. While the PIB containing core (Example 7) initially showed a greater initial blush than other films, this blush cleared completely in 6-7 days. Apparently, this is the time required for moisture absorbed by the film to diffuse to the surface again. While plasticized PVC turns very white when autoclaved, it clears within hours because of its high water vapor transmission rate.

EXAMPLES 9-20

Nominal 8 mil composite films were prepared by conventional co-extrusion. The equipment used comprised a main 2½" extruder for the core material and one 1½" extruder for the film skin. The flow from the 1½" extruder was split to form skins on each face of the elastomer film. Composites of the A/B and A/B/A type were prepared wherein A represents the polyolefin skin and B represents the rubber containing core material. The films were extruded through a set of nip rolls comprising a matte finish silicone rubber roll (55 Shore A) and a polished chrome chill roll. The surface of the film composite intended to be heat sealed to form the inner surface of the bag was placed against the silicone roll of the 3-roll stack and consequently had a matte finish which was the source of most of the observed haze. The formulations are shown in Table VIII and the structure of the film is described in Table IX. Reference to embossing relates to whether or not silicone rubber contact pressure was used. No embossing indicates that an air knife rather than the rubber roll was used as an assist in contacting the film with the metal roll. The film properties are listed in Table X.

Referring to Table X, it is apparent that covering the EPM/RCPP composition with a layer of LLDPE has little effect on the mechanical properties of the composition (Examples 9 and 10). Surprisingly, clarity is reduced, but this is due in part to material which bloomed to the surface of the LLDPE. Clarity improved significantly when the rubber roll was raised, eliminating embossing of the film surface with the matte finish of the roll. (Examples 10 and 11). Further improvements in clarity are achieved by forming a sandwich type A/B/A laminate with the EPM composition and LLDPE (Examples 12 or 13 compared to 11). Haze is reduced somewhat and gloss substantially increased in the A/B compositions when the PPRC is placed in contact with the chill roll (compare Examples 14 and 15).

Monolayer "F" is a softer, tougher (tear/dart drop) film than the monolayer "E" film composition. The softness, outstanding water impermeability and excellent toughness of the A/B/A composite film using RCPP as the skin and a PIB/RCPP core suggest that it is a useful film material for parenteral drug use (Examples 19 and 20). Relative to the EPM compositions, this material has about a 35% better WVTR and 50% greater flexibility. The "hand" of the water filled bags was similar to that of PVC. This film neither tore in the Elmendorf tear tester nor ruptured in the dart test. Adequate clarity can be achieved by replacing the matte finish of the rubber roll with a silicone polished rubber roll. As can be seen from a comparison of runs 19 and 20, a substantial amount of the haze is a result of embossing of the matte finish cut of the film.

While the films of this invention have particular utility in parenteral drug container use, it will be evident from the aforegoing disclosure that the compositions can be used in any food application. For example, the aforedescribed A/B/A polyolefin-rubber composition core laminate can be overlayered with a polyvinylidene chloride film on one surface, using a polyurethane adhesive tie layer to give the film greater impermeability to oxygen. This PVDC coated film can be used as a wrapping for "canless" meats, e.g., ham, since the cooking of the meats can be accomplished after the meat is packaged. This oxygen impermeable film also will find application as containers for oxygen sensitive parenteral or enteral drugs.

In one embodiment of this invention the PVDC can be co-extruded with the core layer to form one surface of an A/B/C composite film. For example, the film structure can comprise one skin of PVDC, another of RCPP, sandwiching a core of rubber composition wherein the rubber is a halogenated rubber or a blend of unhalogenated and halogenated rubbers. The halogenated rubber can be halogenated butyl rubber or polychloroprene. Preferably the rubber comprises about 40 to 60 wt % PIB, about 20 to 40 wt % of butyl rubber and about 20 to 40 wt % of polychloroprene. The co-extrusion can be accomplished with unhalogenated rubbers by using a tie layer between the PVDC and the rubber core.

While haze is an important criterion for determining the usefulness of a film for parenteral drug use, it is apparent that the important haze value is that for internal haze. The elastomeric compositions of this invention have internal haze values of 30% or less. They can be used to prepare useful films having adequate clarity so long as at least one surface of the film has a 45° gloss of at least 40, preferably at least 50, more preferably at least 60, most preferably at least 75. The parenteral drug pouch must be manufactured using the film so that the surface having the lower gloss forms the inside of the pouch so that it will be in contact with the drug fluid. Preferably at least one surface of the film has a gloss of at least 60, more preferably at least 75 as measured at 45° reflected light.

HDPE cannot be used for blending with the elastomer component since it forms compositions with high internal haze. EVA or LDPE cannot be used as the polyolefin component of the rubber olefin blend except in conjunction with at least 15 wt % of PP or RCPP which is required for dimensional thermal stability of the film.

In order to achieve the desired gloss, the film must be brought into contact with the chill roll using the rubber roll (matte or polished). Otherwise there is insufficient contact with the roll to generate the high gloss surface. Air knives of the prior art are inadequate to cause the necessary roll contact.

In a preferred embodiment where the polyolefin is PP or RCPP, the skin surface which is the inside of the pouch, and hence the heat sealed surface, comprises a minor amount of ethylene-vinyl acetate copolymer to improve heat sealing characteristics of the PP or RCPP. The ethylene-vinyl acetate copolymer can comprise about 5 to 40 wt % of the film. However, in a preferred embodiment, the PP or RCPP will comprise about 15 to about 85 wt % of the polyolefin ethylene-vinyl acetate blend.

It will be evident from the foregoing disclosure that each of the polyolefin layers of the composite film can comprise the same or different polyolefin. Further, the polyolefin layers can be blends of polyolefins, e.g., PP/LLDPE; RCPP/LDPE; RCPP/ethylene-vinyl acetate copolymer, etc.

With reference to the metal chill rolls used in the practice of this invention the term "highly polished" means that the roll surface has a root mean square (RMS) of less than 4 micons.

By reference to the foregoing disclosure, it will be evident to those skilled in the art that composite films described herein will have utility, even where they are not transparent, because of their high burst strength and water vapor barrier properties as well as their heat resistance in retorting.

While in the past PVDC has been the oxygen barrier film of choice, more recently ethylene-vinyl alcohol copolymers have been used as oxygen barrier copolymers. It is within the scope of this invention to utilize ethylene-vinyl alcohol copolymers as the skin layer of the composite films of this invention with or without an adhesive tie layer. Additionally, the ethylene-vinyl alcohol (EVOH) copolymers may be utilized as an overlayer adhered to the skin of the composite film by an adhesive tie layer.

Where transparency is not a requirement of the film for a particular use, overlayers other than polyolefins can be utilized to achieve beneficial results. For example, paper or metal foil, e.g., aluminum, copper, etc., can be adhered to the composite film by use of an adhesive tie layer. Such metal foil compositions will have enhanced oxygen and water vapor barrier properties.

The composite films of this invention have a wide range of applications for packaging both solids and liquids. For example, they can be used to prepare containers for fruit juices which can be aseptically packaged. The juices can pasteurized after packaging. Solid materials, e.g., drugs, reactive chemicals, etc., which need to be protected from air or water can also be advantageously packaged in containers made from the composite films of this invention.

The term "retort pouch" as used in the specifications and claims means a container for liquids or solids which can be autoclaved for sterilization, pasteurization or cooking without damage to the pouch. As used with respect to the skin of the composite film, the term "polyolefin" includes EVOH.

In preparing retort pouches and other containers from the composite films of this invention, two sheets of film can be adhesively bonded or heat sealed together to form the pouch or container. Where the pouch or container is to be subjected to heat, e.g., sterilization, the pouch or other container is preferably formed by heat sealing.

In another embodiment the composite film can be coextruded in tubular form and the pouch or bag formed therefrom. In a particular embodiment, the tubular composite film can be placed in a mold and blow-molded into the desired bag, pouch or container form.

Enteral feeding bags, blood bags, parental drug bags and the like can have valves or outlet fittings molded or bonded into the bag or pouch structure.

TABLE V

| | CO-EXTRUDED SHEET STRUCTURES | | | | | | | |
|---|---|---|---|---|---|---|---|---|
| EXAMPLE # | 1 | 2 | 3 | 4 | 5 | 6 | 7 | 8 |
| Layer[1] | | | | | | | | |
| Skin | PPRC | HDPE | PP | HDPE | PPRC | PPRC | PPRC | None |
| Core | (a) | V-1721/PPRC | V-1721 | V-1721 | V-1721 | (b) | (c) | (d) |
| Skin | PPRC | HDPE | PP | HDPE | PPRC | PPRC | PPRC | None |
| Total Avg. Gauge, mils | 11.0 | 9.8 | 10.0 | 11.6 | 11.2 | 7.9 | 11.6 | 11.1 |
| Calc. Gauge, mils[2] | | | | | | | | |
| Skin | 1.0 | 1.1 | 0.9 | 0.4 | 1.1 | 0.9 | 1.4 | — |
| Core | 9.0 | 7.6 | 8.2 | 10.8 | 9.0 | 6.1 | 8.8 | 11.1 |
| Skin | 1.0 | 1.1 | 0.9 | 0.4 | 1.1 | 0.9 | 1.4 | — |

[1]Raw Materials:
PPRC - 4.0 MFR
HDPE - 6.0 MI, 0.960 g/cc
PP - 4.0 MFR
(a) - 70/30 V-1721/PPRC - Dry Blend of Pelletized V-1721 (⅛" pellets) and PPRC
(b) - 50/50 Homo PP/Butyl 077 intensively mixed
(c) - 65/35 VISTANEX L-100/PP (4.0 MFR) intensively mixed

TABLE V-continued

CO-EXTRUDED SHEET STRUCTURES

| EXAMPLE # | 1 | 2 | 3 | 4 | 5 | 6 | 7 | 8 |
|---|---|---|---|---|---|---|---|---|

(d) - 70/30 PPRC/V-1721 intensively mixed
Note: No adhesive tie layer was applied between layers.
[2]Based on extruder output rate, sheet width, line speed and density.

TABLE VI

PROPERTIES OF CO-EXTRUDED SHEETS

| Example # | | 1 | 2 | 3 | 4 | 5 | 6 | 7 | 8 |
|---|---|---|---|---|---|---|---|---|---|
| Avg. Gauge, mils | | 11.0 | 9.8 | 10.0 | 11.6 | 11.2 | 7.9 | 11.6 | 11.1 |
| Tensile Strength, psi | | | | | | | | | |
| @ Yield | MD | 1,690 | 925 | 465 | 520 | 1,025 | 2,960 | 1,375 | 2,370 |
|  | TD | 1,035 | 735 | 415 | 365 | 405 | 1,200 | 670 | 2,735 |
| @ Break | MD | 3,750 | 2,500 | 1,130 | 2,200 | 1,540 | 2,715 | 2,320 | 3,800 |
|  | TD | 2,245 | 2,125 | 1,530 | 1,280 | 1,425 | 1,915 | 1,670 | 1,680 |
| Elongation, % | | | | | | | | | |
| @ Yield | MD | 36 | 26 | 37 | 44 | 34 | 14 | 29 | 16 |
|  | TD | 20 | 28 | 25 | 26 | 20 | 15 | 20 | 15 |
| @ Break | MD | 550 | 780 | 530 | 415 | — | 590 | 415 | 575 |
|  | TD | 815 | 800 | 790 | 865 | 850 | 590 | 580 | 335 |
| 1% Secant Modulus, psi | | | | | | | | | |
|  | MD | 45,500 | 32,400 | 12,800 | 7,200 | 13,800 | 48,200 | 47,100 | 82,200 |
| Elmendorf Tear, g/mil | | | | | | | | | |
|  | MD | 46 | 183 | 49 | 108 | 61 | 225 | 150 | 25 |
|  | TD | NT[1] | 222 | 151 | 195 | 116 | 126 | NT[1] | 181 |
| Haze, % | | 9.6 | 10.6 | 5.3 | 9.9 | 10.3 | 19.0 | 26.2 | 6.5 |
| WVTR at 100 F., 90% RH, g/m²/day | | 2.1 | 2.7 | — | — | — | — | 0.8 | 1.8 |

[1] NT - No Tear

TABLE VII

AUTOCLAVABILITY RESULTS

| EXAMPLE | 1 | 2 | 3 | 4 | 5 | 6 | 7 | 8 |
|---|---|---|---|---|---|---|---|---|
| Vx/HDPE Overwrap[2] | | | | | | | | |
| Inner Bag Rupture | No | No | Yes[1] | Yes[1] | Yes[1] | No | No | No |
| Sticking to Overwrap | No | Slight | Some | Some | — | No | No | Slight |
| Clarity | Good | Fair | Whitening | Hazy | Whitening | Good | Excellent | Good |
| No Overwrap[3] | | | | | | | | |
| Bag Rupture | No | No | Yes[1] | Yes[1] | Yes[1] No | No | No | Yes |
| Blushing | Yes | Yes | — | — | — | Yes | Yes | Yes |
| Days to Clear | 3–4 | 3–4 | — | — | — | — | 6–7 | 3–4 |
| Ultimate Clarity | Good | Good | — | — | — | V. Good | Excellent | V. Good |

[1] Excessive shrinkage.
[2] Commercially available PIB/HDPE (30/70) blend used as water vapor barrier overwrap.
[3] Submerged in water during autoclave cycle.

TABLE VIII

DESCRIPTION OF RESINS

| RESIN/USE | COMPOSITION | | MFR[1] @ 230 C. | OTHER COMMENTS |
|---|---|---|---|---|
| Coextrusion Core | | | | |
| C | EPM | 42.5% | 1.8 | 50 ML(1 + 8)127 C., 76% $C_2$= |
|  | LLDPE A | 15.0 | | 1 MI, 0.918 g/cc |
|  | PPRC A | 42.5 | | 4 MFR (Condition L) |
| D | PIB | 64.9 | 0.34 | $M_v$ = 1,200,000 |
|  | PPRC B | 34.9 | | 3 MFR |
| Coextrusion Skin | | | | |
| LLDPE B | | | 2.7 | 0.935 Density, 126° C. MP (peak) |
| PPRC C | Random PPRC (4¼% $C_2$=) | | 6.4 | 129° C. MP(peak) |
| PPRC D | Random PPRC (4¼% $C_2$=) | | 1.2 | 128° C. MP(peak) |
| Monolayer | | | | |
| E | PIB | 39.6% | 1.0 | $M_v$ = 1,200,000 |
|  | PPRC B | 59.4 | | 3 MFR |
|  | Irganox 1076 | 0.12 | | |
|  | Syloid 221 | 0.7 | | |
|  | Armoslip EXP | 0.2 | | |
| F | PIB | 40.0% | 0.48 | $M_v$ = 1,200,000 |
|  | LLDPE A | 14.0 | | 1 MI, 0.918 g/cc |

TABLE VIII-continued

DESCRIPTION OF RESINS

| RESIN/USE | COMPOSITION | MFR[1] @ 230 C. | OTHER COMMENTS |
|---|---|---|---|
| | PPRC E | 45.0 | 3 MFR |
| | Sandostab P-EPQ | 0.18 | |
| | Syloid 221 | 0.7 | |
| | Armoslip EXP | 0.2 | |
| G | IIR | 40.3 | 48 ML(1 + 8)125 C., 0.8% unsaturation |
| | PP | 59.7 | 4 MFR |
| | Irganox 1076 | 0.12 | |
| | Syloid 221 | 0.7 | |
| | Armoslip EXP | 0.2 | |

[1]MRF of total composition

TABLE IX

STRUCTURE OF MONOLAYER AND COEXTRUDED FILMS

| EXAMPLE | 9 | 10 | 11 | 12 | 13 | 14 |
|---|---|---|---|---|---|---|
| Coextrusion | No | Yes | Yes | Yes | Yes | Yes |
| Embossed Layer[1] | Yes | Yes | No | No | No | Yes |
| A Upper | — | LLDPE | LLDPE | LLDPE | LLDPE | C |
| B | C | C | C | C | C | PPRC C |
| A Lower | — | — | — | LLDPE | LLDPE | — |
| Nominal Gauge[2]-mils | | | | | | |
| A Upper | — | 0.8–1.0 | 0.8–1.0 | 0.4–0.5 | 0.8–1.0 | 6.5–7.4 |
| B | 7–8 | 6.2–7.0 | 6.2–7.0 | 6.2–7.0 | 5.4–6.0 | 0.5–0.6 |
| A Lower | — | — | — | 0.4–0.5 | 0.8–1.0 | — |
| Distribution[2]- % | | | | | | |
| A Upper | — | 12.1 | 12.1 | 6.0 | 11.1 | 92.4 |
| B | 100 | 87.9 | 87.9 | 88.0 | 77.8 | 7.6 |
| A Lower | — | — | — | 6.0 | 11.1 | — |
| Example | 15 | 16 | 17 | 18 | 19 | 20 |
| Coextrusion | Yes | No | No | Yes | Yes | Yes |
| Embossed Layer[1] | Yes | Yes | Yes | Yes | No | Yes |
| A Upper | PPRC C | — | — | F | PPRC D | PPRC D |
| B | C | E | F | PPRC C | D | D |
| A Lower | — | — | — | — | PPRC D | PPRC D |
| Nominal Gauge[2]-mils | | | | | | |
| A Upper | 0.5–0.6 | — | — | 6.5–7.4 | 0.5–0.6 | 0.5–0.6 |
| B | 6.5–7.4 | 7–8 | 7–8 | 0.5–0.6 | 6.0–6.8 | 6.0–6.8 |
| A Lower | — | — | — | — | 0.5–0.6 | 0.5–0.6 |
| Distribution[2]- % | | | | | | |
| A Upper | 7.8 | — | — | 92.4 | 7.4 | 7.4 |
| B | 92.2 | 100 | 100 | 7.6 | 85.2 | 85.2 |
| A Lower | — | — | — | — | 7.4 | 7.4 |

[1]The A upper layer was placed adjacent to the top, matte finish silicone rubber roll. The A lower or B layer, depending on the type of extrusion, was placed adjacent to the chrome finish chill roll.
[2]Based on measured extruder output rates:
C 1.57 lb/hr/RPM (Main Extruder)
LLDPE 0.53 lb/hr/RPM (Satellite Extruder)
PPRC C 0.26 lb/hr/RPM (Satellite Extruder)
D 1.42 lb/hr/RPM (Main Extruder)
PPRC D 0.24 lb/hr/RPM (Satellite Extruder)

TABLE X
PROPERTIES OF MONOLAYER AND COEXTRUDED FILMS

| EXAMPLE | 9 | 10 | 11 | 12 | 13 | 14 | 15 | 16 | 17 | 18 | 19 | 20 |
|---|---|---|---|---|---|---|---|---|---|---|---|---|
| Layer - A | — | LLDPE | LLDPE | LLDPE | LLDPE | C | PPRC C | — | — | — | — | PPRC D |
| B | C | C | C | C | C | PPRC C | C | E | F | F | D | D |
| A | — | — | — | LLDPE | LLDPE | — | — | — | — | — | PPRC D | PPRC D |
| Embossed | Yes | Yes | No | No | No | Yes | Yes | Yes | Yes | Yes | No | Yes |
| Avg. Gauge, mils | 7.2 | 7.4 | 8.3 | 8.4 | 8.4 | 7.4 | 7.4 | 7.0 | 7.9 | 8.1 | 7.7 | 7.8 |
| Tensile Stregth, psi | | | | | | | | | | | | |
| Yield MD | 1550 | 1465 | 1415 | 1350 | 1295 | 1435 | 1625 | 1710 | 1330 | 1270 | 835 | 790 |
| TD | 1350 | 1380 | 1270 | 1180 | 1106 | 1260 | 1410 | 1260 | 1065 | 1000 | 530 | 490 |
| Break MD | 5610 | 5165 | 4575 | 4845 | 4340 | 5285 | 5145 | 3225 | 3375 | 3715 | 2040 | 2025 |
| TD | 4290 | 4285 | 4235 | 4110 | 4100 | 4390 | 4270 | 2610 | 2800 | 2805 | 2065 | 2000 |
| Elongation, % | | | | | | | | | | | | |
| Yield MD | 25 | 20 | 22 | 25 | 20 | 20 | 20 | 15 | 15 | 15 | 15 | 20 |
| TD | 20 | 25 | 25 | 20 | 20 | 25 | 20 | 10 | 20 | 15 | 15 | 15 |
| Break MD | 770 | 775 | 805 | 875 | 815 | 820 | 760 | 770 | 780 | 800 | 670 | 675 |
| TD | 910 | 910 | 920 | 930 | 955 | 925 | 920 | 790 | 805 | 840 | 765 | 770 |
| 1% Secant Modulus, psi | | | | | | | | | | | | |
| MD | 28,100 | 29,800 | 29,900 | 28,000 | 26,200 | 26,000 | 29,800 | 37,200 | 28,500 | 24,100 | 19,000 | 18,000 |
| TD | 25,300 | 26,000 | 25,200 | 22,700 | 22,200 | 23,600 | 27,800 | 32,200 | 21,100 | 20,000 | 8,400 | 8,200 |
| Elmendorf Tear, g/mil | | | | | | | | | | | | |
| MD | 175 | 160 | 236 | 186 | 202 | 221 | 161 | 303 | 331 | 356 | 328 | NB |
| TD | 315 | 324 | 252 | 247 | 257 | 386 | 302 | 386 | 415 | 385 | NB[1] | NB |
| Dart Drop Impact | | | | | | | | | | | | |
| TEDD, in-lbs/mil | 15.5 | 17.2 | 16.6 | 15.3 | 16.1 | 21.2 | 15.4 | 26.1 | 31.6 | NB | NB | NB |
| Haze, % | | | | | | | | | | | | |
| in Air | 85.6 | 92.9 | 34.3 | 4.6 | 4.6 | 80.3 | 77.0 | 95.2 | 96.0 | 91.3 | 40.2 | 80.8 |
| in Water | 36.6 | 52.6 | 6.2 | 4.5 | 4.0 | 32.0 | 27.4 | 58.7 | 68.0 | 52.6 | 25.4 | 33.8 |
| Gloss | | | | | | | | | | | | |
| Side 1 | 40.6 | 46.0 | 24.3 | 75.4 | 80.7 | 35.6 | 41.7 | 27.8 | 21.4 | 41.4 | 21.4 | 46.4 |
| Side 2 | 4.1 | 3.3 | 52.2 | 74.5 | 80.9 | 3.7 | 4.7 | 3.9 | 3.8 | 4.1 | 15.2 | 5.1 |
| WVTR₂ @ 100 F., 100% RH | | | | | | | | | | | | |
| g/m²/day | 3.4 | 3.25 | 3.1 | 2.9 | 3.05 | 3.5 | 3.7 | 2.35 | 2.3 | 2.1 | 1.95 | 1.95 |
| @ mils | 7.3 | 7.0 | 7.2 | 8.4 | 7.2 | 7.3 | 7.3 | 6.8 | 7.8 | 8.5 | 8.0 | 7.8 |

[1] NB = No Break

What is claimed is:

1. A composite film composition comprising a rubber containing core component and at least one skin layer wherein the skin layer comprises a polyolefin resin and the rubber containing core component comprises about 50 wt % to 85 wt % of rubber and about 50 wt % to 15 wt % polyolefin wherein said rubber is selected from the group consisting of polyisobutylene, butyl rubber, halogenated butyl rubber, ethylene propylene rubber, ethylene-propylene-diene rubber, and polychloroprene.

2. The composite film according to claim 1 wherein the rubber core component comprises about 60 to about 85 wt % of rubber and about 15 to about 40 wt % of a polyolefin.

3. The composite film according to claim 1 wherein the polyolefin skin layer is polypropylene, RCPP, HDPE, LLDPE, polybutene-1 or mixtures thereof.

4. The composite film according to claim 1 wherein the rubber composition comprises about 65 to about 85 wt % rubber and about 15 to about 35% polyolefin.

5. The composite film according to claim 1 wherein the rubber composition comprises 65 wt % PIB and 35 wt % PP or RCPP.

6. The composite film according to claim 1 wherein the film comprises a sandwich construction of two polyolefin skins having an inner rubber composition core.

7. The composite film according to claim 6 wherein the rubber composition comprises 50 to about 85 wt % of rubber and about 15 to about 50 wt % of a polyolefin.

8. The composite film according to claim 6 wherein the rubber is PIB, butyl rubber, halogenated butyl rubber, EPM, EPDM or polychloroprene.

9. The composite film according to claim 6 wherein the rubber composition comprises a blend of PIB with PP or RCPP.

10. The composite film according to claim 6 wherein the rubber composition comprises about 65 to about 85 wt % rubber and about 15 to about 35 wt % polyolefin.

11. The composite film composition according to claim 1 wherein the rubber is butyl rubber or PIB.

12. The composite film composition according to claim 1 wherein the rubber is EPM or EPDM.

13. The composite film composition according to claim 6 wherein the skin layer comprises a polyolefin which is PP or RCPP.

14. The composite film composition according to claim 10 wherein the rubber is PIB and the polyolefin is PP or RCPP.

15. The composite film composition according to claim 14 wherein the skin layer is PP or RCPP.

16. The composite film according to claim 1 wherein the rubber containing core component comprises an EPM or EPDM rubber and PP or RCPP polyolefin.

17. The composite film according to claim 16 wherein the rubber comprises about 65 wt % to about 85 wt % of the rubber containing component.

18. The composite film according to claim 1 wherein at least one skin layer has a 45° gloss of at least 50.

19. The composite film according to claim 18 wherein the 45° gloss is at least 60.

20. The composite film according to claim 18 wherein the 45° gloss is at least 75.

21. The composite film composition according to claim 6 wherein the rubber is butyl rubber or PIB.

22. The composite film composition according to claim 6 wherein the rubber is EPM or EPDM.

23. The composite film composition according to claim 6 wherein one polyolefin skin comprises a different polyolefin than the other polyolefin skin.

24. The composite film composition according to claim 6 wherein one polyolefin skin comprises PP or RCPP and the other polyolefin skin comprises PVDC.

25. The composite according to claim 24 wherein the rubber comprises at least one halogenated rubber.

26. The composite according to claim 25 wherein the PVDC is tied to the rubber composition by a tie layer.

27. The composite according to claim 26 wherein the tie layer is a polyurethane adhesive.

28. The composite according to claim 6 wherein the polyolefin skins comprise a polyolefin other than PVDC and at least one of said polyolefin skins is overlayered by a film of PVDC adhered thereto.

29. A retort pouch container for solids and liquids prepared from the composite film according to claim 1.

30. The composite film according to claim 6 wherein at least one of the skin layers has a 45° gloss of at least 50.

31. The composite film according to claim 6 wherein at least one of the skin layers has a 45° gloss of at least 60.

32. The composite film according to claim 6 wherein at least one of the skin layers has a 45° gloss of at least 75.

* * * * *